3,151,930
METHOD FOR PREPARING LITHIUM BOROHYDRIDE
Robert W. Bragdon, Marblehead, and Frank P. Del Giudice, Beverly, Mass., assignors to Metal Hydrides Incorporated, Beverly, Mass., a company of Massachusetts
No Drawing. Filed Mar. 23, 1960, Ser. No. 16,959
7 Claims. (Cl. 23—14)

This invention relates to the preparation of lithium borohydride.

The patents to H. I. Schlesinger and H. C. Brown No. 2,461,661, dated February 15, 1949, and No. 2,534,533, dated December 19, 1950, describe methods for preparing alkali metal borohydrides. In accordance with the former patent, an alkali metal alkoxyborohydride is reacted at low temperature with diborane to form an alkali metal borohydride and a volatile alkyl borate. By the method of the latter patent, an alkali metal hydride is reacted at an elevated temperature with an alkyl borate to form an alkali metal borohydride and an alkali metal alkoxide. Neither of these methods has been found suitable for the preparation of lithium borohydride on a commercial scale.

Later, it was proposed to produce lithium borohydride by the metathetical reaction of lithium chloride and sodium borohydride in isopropylamine as the reaction medium, a large excess of lithium chloride being required. The reaction is illustrated by the equation:

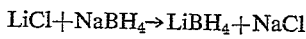

$$LiCl + NaBH_4 \rightarrow LiBH_4 + NaCl$$

The mixture was stirred and refluxed for 2 to 3 hours and then filtered to separate the precipitated sodium chloride. The filtrate was dried and the crude product extracted with ether to separate the soluble lithium borohydride from the excess of insoluble lithium chloride. After filtration, the ether filtrate was dried under heat and suction. This method was unsatisfactory when attempts were made to use it on a commercial scale since (1) poor and variable yields resulted, (2) acceptable purity was difficult to achieve on a reproducible basis, (3) filtration of the reaction mixture was very slow and difficult and (4) distillation of the isopropylamine from the first filtrate was plagued by foaming. The process also was basically uneconomical since (1) the use of an excess of 25 to 50 percent of lithium chloride was required to force the reaction, (2) excessively large amounts of solvents were required and (3) two separate solvent steps were required.

The present invention provides a method for preparing lithium borohydride which involves the metathetical reaction of lithium chloride and sodium borohydride and overcomes the difficulties and disadvantages of the previous above-mentioned metathetical reaction.

In accordance with the method of the invention, anhydrous lithium chloride is mixed with anhydrous sodium borohydride and a first anhydrous inert organic liquid while stirring to obtain a fluid slurry. Preferably, the lithium chloride and sodium borohydride are used in equimolar amounts but this is not essential. The amount of such organic liquid used should not be substantially more, but preferably is slightly less, than the amount required to dissolve completely the amount of lithium borohydride theoretically expected to be formed. In some instances, the amount of such first organic liquid may be as low as about 55 percent of the amount required to dissolve completely the amount of lithium borohydride theoretically expected to be formed. The reaction between the lithium chloride and sodium borohydride is exothermic and usually proceeds to substantial completion in less than about 20 minutes if well stirred. Usually, however, the mixture is well stirred for about 30 minutes to assure completion of the reaction. At this stage, the reaction slurry is too thick for practical filtration.

After completion of the reaction, the reaction slurry is diluted with an amount of a second inert anhydrous organic liquid to render the mixture sufficiently fluid for practical filtration. The resulting mixture then is stirred for an additional period, preferably under reflux, to assure completion of solution of the lithium borohydride formed. It has been found that such additional period may vary from about 5 minutes to 3 hours and produce substantially equally good results. The resulting liquor is essentially a solution of lithium borohydride in the mixture of organic liquids containing precipitated sodium chloride. The precipitate is removed, as by filtration, and then the organic liquids are removed by distillation to obtain solid lithium borohydride.

The above mentioned first anhydrous inert organic liquid may be a liquid, referred to herein for convenience as type A, which is a non-solvent for sodium halides and a solvent for lithium halides and the borohydrides of lithium and sodium; or the first organic liquid may be a liquid, referred to herein for convenience as type B, which is a solvent for the halides of sodium and lithium and the borohydrides of sodium and lithium; or the first organic liquid may be a mixture of the type A and type B liquids. Illustrative examples of the type A liquids are pyridine and the primary alkyl amines, such as methylamine, ethylamine, propylamine, isopropylamine and butylamine. An illustrative example of the type B liquid is liquid ammonia.

The above mentioned second anhydrous inert organic liquid may be a liquid, referred to herein for convenience as type C, which is a solvent for lithium borohydride and a non-solvent for sodium borohydride and the halides of sodium and lithium; or the second organic liquid may be a liquid, referred to herein for convenience as type D, which is a non-solvent for the borohydrides of sodium and lithium and the halides of sodium and lithium; or the second organic liquid may be a liquid, referred to herein for convenience as type E, which is a non-solvent for sodium borohydride and sodium halides and a solvent for lithium halides and lithium borohydride; or the second organic liquid may be a mixture of type C, type D and type E liquids. Illustrative examples of type C liquids are the lower alkyl ethers, such as diethyl ether, isopropyl ether, butyl ether and dimethyl ether. Illustrative examples of type D liquids are hydrocarbons, such as benzene, toluene, xylene, hexane, cyclohexane, octane and ligroin. Tetrahydrofuran is illustrative of type E liquids.

Certain combinations of the above mentioned organic liquids result in two layer systems under certain conditions of temperature and concentration. In such cases, the lithium borohydride dissolves in the type A or type B liquid and salts out the type C, type D and type E liquid. Examples are methyl and ethylamine with diethyl ether and isopropylamine with isopropyl ether and hexane.

In place of lithium chloride other lithium halides may be used in the practice of the invention but lithium chloride is preferred. Potassium borohydride may be used in place of sodium borohydride but better results usually are obtained with the latter. An outstanding advantage of the method of the invention is that the reactants may be used in equimolar proportions with excellent results but such proportions are not essential.

In the practice of the invention, the amount of the type A or type B organic liquid used is important. If the amount of this liquid used is more than the amount required to dissolve completely the lithium borohydride formed, the purity of the final product tends to drop. If slightly less than this amount of the type A or type B liquid is used, good results are obtained because the type C, type D and type E liquids have a synergistic effect on the solubility of the lithium borohydride. For example, the solubility of lithium borohydride at 25° C. is about 12 grams per 100 grams of isopropylamine. Nevertheless, over 18 parts of lithium borohydride can be recovered per 100 parts of isopropylamine used. In general, the amount of type A or type B liquid used should not be substantially more, but preferably is slightly less, than the amount required to dissolve completely the amount of the lithium borohydride expected to be formed. The amount of the type C, type D or type E liquid used should be sufficient to dilute the thick, viscous reaction mix to permit practical filtration.

The invention is illustrated further by the following specific examples.

*Example 1*

38.0 grams of anhydrous sodium borohydride were combined with 43.0 grams of anhydrous lithium chloride in a 1-liter, 3-necked round bottom reaction flask fitted with a condenser, Herschberg-type stirrer and liquid addition funnel. 100 grams of anhydrous isopropylamine was added to the mixture with stirring over a period of 2 minutes. The reaction mixture turned to a fluid slurry. The mixture was stirred and refluxed for 30 minutes and became a thick syrup. Then 200 grams of anhydrous benzene were added to the reaction mixture while stirring to render the mixture sufficiently fluid to permit practical filtration. This mixture was stirred and refluxed for 3 hours and then cooled to room temperature and filtered. The filter residue was washed with two 100 gram portions of benzene. The filtrate and washings were mixed and concentrated by distillation at atmospheric pressure and finally dried to a solid at 150° C. in vacuum. 18.8 grams of product, analyzing 97.3% lithium borohydride, were obtained, representing a yield of 83.8% of theory.

*Example 2*

38.0 grams of 98.8% pure anhydrous sodium borohydride was mixed with 42.4 grams of 97.7% anhydrous lithium chloride in a reaction flask of the type used in Example 1. 59.0 grams of anhydrous isopropylamine was added to the mixture in the flask with stirring over a period of about one minute. The mixture became fluid and refluxed. Reflux was continued for 30 minutes with stirring and the reaction mixture became a thick syrup. Then, 241 grams of diethyl ether were added to the reaction mixture. The reaction mixture was stirred and refluxed for 3 hours and then was cooled and filtered through a medium porosity glass sintered filter funnel. The filter residue was washed with three 50 ml. portions of diethyl ether. The collected filtrate was evaporated to dryness, first at low heat and then at 150° C. 18.2 grams of product were recovered which analyzed 96.1 percent lithium borohydride, representing a yield of 80.2 percent of theory.

*Example 3*

This example illustrates the rate of the metathetical reaction of lithium chloride with sodium borohydride in the inert organic liquid referred to herein as the first organic liquid. Two moles of anhydrous sodium borohydride were combined with two moles of anhydrous lithium chloride in a 3-liter, 3-necked round bottom flask fitted with a condenser, Herschberg-type stirrer and liquid additional funnel. 800 grams of anhydrous isopropylamine were added to the mixture over a period of 2 minutes and 30 seconds with stirring. The reaction mixture turned to a fluid slurry. Approximately 100 cc. samples of the reaction mixture were taken at intervals over the course of the next fifty minutes, the samples being taken at 5, 10, 20, 30 and 50 minutes. During this period, the reaction mixture was well stirred but was not heated. Initial mixing caused refluxing to occur and the mixture continued to reflux until about the 18th minute. Each sample, in turn, was centrifuged at 2000 r.p.m. to free the supernatant liquid of precipitated materials. The clear liquid was then decanted and dried by vacuum evaporation. A final heating in vacuum at 150° C. served to remove all of the solvent. The dried products were analyzed for hydrogen, lithium, sodium and chlorine. The results are shown in the following table.

| Time in minutes | Percent H | Percent Li | Percent Na | Percent Cl |
|---|---|---|---|---|
| 5 | 11.8 | 5.96 | 52.5 | 0.37 |
| 10 | 15.4 | 25.9 | 9.65 | 2.37 |
| 20 | 12.1 | 26.7 | 0.26 | 25.5 |
| 30 | 11.5 | 26.7 | 0.23 | |
| 50 | 12.0 | 26.0 | 0.25 | |

The remainder of the reaction mixture was heated to reflux and stirred for an additional 2 hours. The product isolated after this treatment analyzed 12.5% hydrogen, 26.4% lithium, 0.25% sodium and 21.9% chlorine. The above data leads to the conclusion that the reaction was substantially complete in 20 minutes or less.

We claim:

1. In the method for preparing lithium borohydride by the metathetical reaction of a lithium halide with sodium borohydride, the steps which comprise mixing an anhydrous lithium halide with anhydrous sodium borohydride and a first anhydrous inert organic liquid, said first organic liquid consisting of (1) from 0 to 100 percent of a liquid selected from the group consisting of pyridine and primary lower alkyl amines and (2) from 0 to 100 percent of liquid ammonia, stirring the slurry until reaction between the lithium halide and sodium borohydride has proceeded to substantial completion, thereafter diluting the reaction mixture with an amount of a second anhydrous inert organic liquid to render the mixture sufficiently fluid for filtration, said second organic liquid consisting of (1) from 0 to 100 percent of a lower alkyl ether, and (2) from 0 to 100 percent of a liquid hydrocarbon selected from the group consisting of benzene, toluene, xylene, hexane, cyclohexane, octane, and ligroin, and (3) from 0 to 100 percent of tetrahydrofuran, thereafter stirring the mixture to assure that substantially all the lithium borohydride formed is dissolved and thereby produce a liquor consisting essentially of a mixture of said first and second organic liquids containing dissolved lithium borohydride and a precipitate of sodium halide, removing the precipitate from said liquor to obtain a precipitate-freed liquor which is essentially a solution of lithium borohydride in an organic liquid, the amount of said first organic liquid used being not substantially more than the amount required to dissolve completely the amount of lithium borohydride formed.

2. The method as claimed by claim 1 wherein said first organic liquid is a primary lower alkyl amine.

3. The method as claimed by claim 1 wherein said first organic liquid is pyridine.

4. The method as claimed by claim 1 wherein said first organic liquid is liquid ammonia.

5. The method as claimed by claim 2 wherein said first organic liquid is isopropylamine.

6. The method as claimed by claim 5 wherein said second organic liquid is diethyl ether.

7. The method as claimed by claim 5 wherein said second organic liquid is benzene.

References Cited in the file of this patent

UNITED STATES PATENTS

| | | |
|---|---|---|
| 2,461,661 | Schlesinger et al. | Feb. 15, 1949 |
| 2,726,926 | Paul et al. | Dec. 13, 1955 |

OTHER REFERENCES

Schlesinger et al.: J.A.C.S., vol. 75, January 5, 1953, pages 212–213.